Nov. 4, 1958 — S. S. AIDLIN — 2,858,930
AUTOMATIC FEEDING APPARATUS
Filed April 28, 1955 — 3 Sheets-Sheet 1
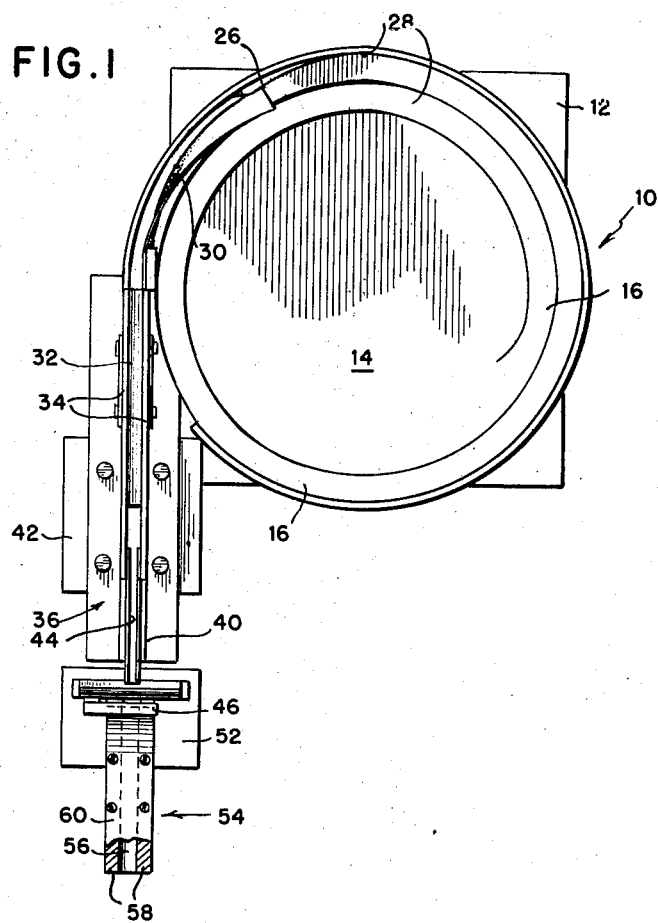
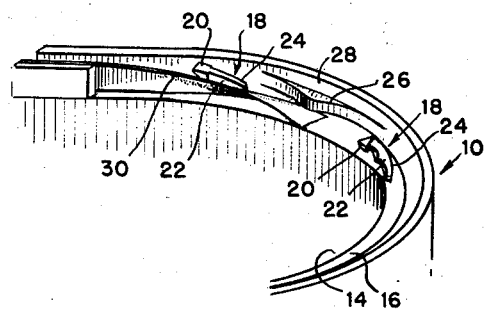
INVENTOR.
Samuel S. Aidlin
BY
ATTORNEY Nov. 4, 1958
S. S. AIDLIN
2,858,930
AUTOMATIC FEEDING APPARATUS
Filed April 28, 1955
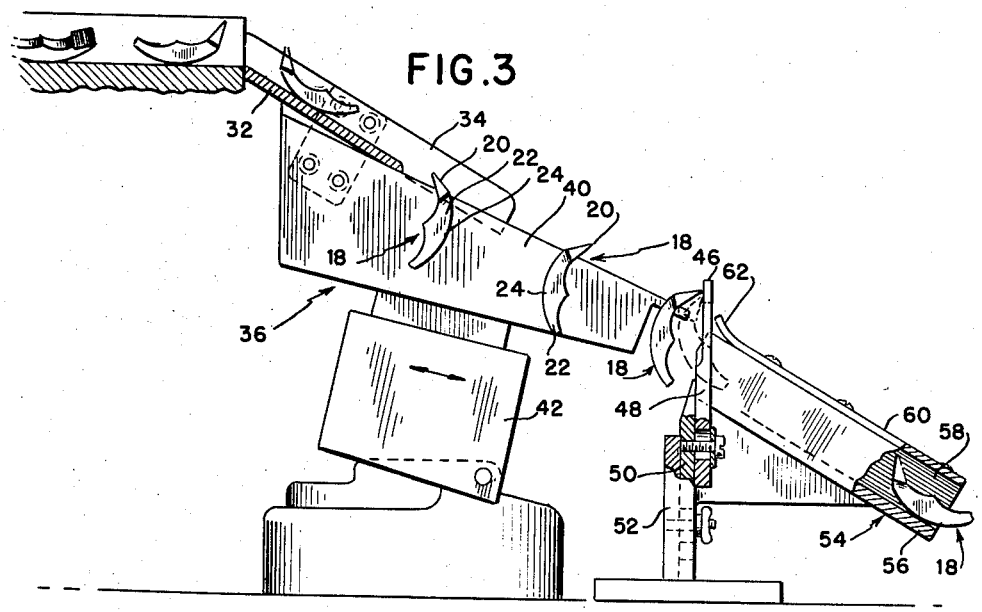
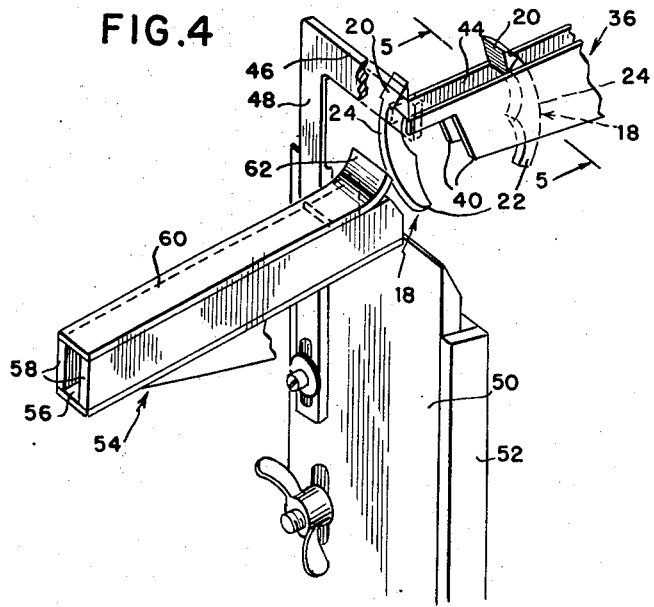
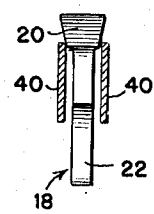
INVENTOR.
Samuel S. Aidlin
BY
ATTORNEY Nov. 4, 1958    S. S. AIDLIN    2,858,930
AUTOMATIC FEEDING APPARATUS
Filed April 28, 1955    3 Sheets-Sheet 3

INVENTOR.
Samuel S. Aidlin
BY

ATTORNEY

United States Patent Office 2,858,930
Patented Nov. 4, 1958

2,858,930

AUTOMATIC FEEDING APPARATUS

Samuel S. Aidlin, New York, N. Y.

Application April 28, 1955, Serial No. 504,574

22 Claims. (Cl. 198—33)

The present invention relates to feeding apparatus, and, more particularly, to apparatus for feeding objects or articles of irregular shape and thickness to processing machines, and especially to automatic feeding apparatus for such objects or parts.

Automatic feeding apparatus for different types of articles, having either an irregular shape or varying thickness, have heretofore been known. However, automatic feeding apparatus for articles that are both of irregular shape, such as a curved or bent shape, or having an arcuate side, and of varying thickness, for the purpose of presenting a succession of such articles to a processing apparatus in proper uniform, position so that they may all successively receive the same processing or treatment at the same, proper part thereof, have heretofore, as far as I am aware, not been made or known. One such article, of irregular, curved shape and of varying thickness for which there has heretofore been no successful automatic feeding apparatus is a removable saw tooth or bit which is longitudinally arcuate and which is formed with an enlarged head at one end which requires to be ground in a particular succession of steps to provide a cutting edge. Heretofore, the saw tooth blanks of the character described had to be hand fed into a conveyor with the curvature turned in the proper direction and with the head in proper position so as to be received in the grinding apparatus in uniform position for the several operations, in proper sequence, by which such blank is trimmed and sharpened.

The present invention is directed to the provision of apparatus which will automatically feed and successively convey removable saw bits blanks of the character described and similar articles having an irregular, asymmetric shape and varying thickness to processing apparatus, in proper position to receive the processing treatments on the same parts thereof.

It is an object of the present invention to provide automatic feeding devices of the character described which are highly effective for their purpose and will feed to the processing apparatus only properly oriented articles to thereby avoid any jamming or damage to the processing apparatus and damage or spoilage of the articles themselves.

It is another object of the present invention to provide feeding apparatus of the character described that will work smoothly, evenly and continuously, and at a relatively rapid rate and will not readily jam or otherwise go out of order.

It is a further object of the present invention to provide automatic feeding apparatus of the character described which are of relatively simple construction and economical to produce, and which are simple and easy to operate and maintain.

It is a still further object of the present invention to provide automatic feeding apparatus of the character described which are relatively compact and occupy but little space.

The foregoing and other objects and advantages of the automatic feeding apparatus of the present invention will become more readily comprehensible to those skilled in the art from the embodiment thereof, adapted for feeding blanks for removable saw teeth or bits, shown in the accompanying drawing, and from the description following. It is to be understood, however, that such embodiment is shown by way of illustration only, to make the principles and practice of the invention more readily comprehensible and without any intent of limiting the invention to the specific details therein shown.

In the drawing:

Fig. 1 is a top plan view of the apparatus of the present invention;

Fig. 2 is an enlarged, fragmentary view of the portion of the apparatus effecting the first or partial orienting step of the feeding apparatus;

Fig. 3 is an enlarged, fragmentary, side elevational and partly sectional view of the portion of the apparatus which selects the properly oriented saw teeth and conveys them to the processing apparatus, and the means for rejecting and shunting away those articles that are not properly oriented;

Fig. 4 is an enlarged, perspective, detailed view, partly broken away, of the selecting mechanism of the apparatus;

Fig. 5 is a section taken on line 5—5 of Fig. 4;

Figure 6:
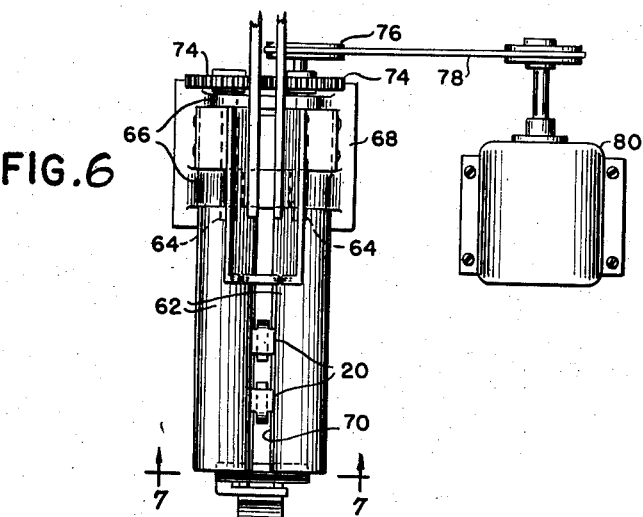
Fig. 6 is a top plan view of a modified conveying mechanism for use with the apparatus of the present invention.

Referring now more specifically to the accompanying drawing, the feeding apparatus of the present invention comprises a vibratory or tumbling type bowl feeder, including a hopper or bowl, generally designated as 10, which is operatively mounted and connected to the vibrating mechanism, more or less diagrammatically illustrated as 12, which may be of any desirable or suitable type, many of which are well known and commercially used in the art. The hopper 10 includes a central bowl portion, 14, into which the articles are dropped, and a relatively narrow, marginal, upwardly spiralling track, 16, surrounding the same; the spiral track 16 being preferably formed without any inner wall, and preferably of a width to accommodate the widest dimension of only a single article, so as to restrict as far as possible the movement of the items upwardly thereon under the impulse of the vibration to which the hopper is subjected to not more than a single line of such articles; any articles forming a double line dropping off into the bowl center 14.

Thus, in the illustrated embodiment, the spiral is of a width greater than the thickness of the saw tooth or bit, 18, sufficient to accommodate such bit in its arcuate width.

It will be seen that the bit 18 is of a width greater than its thickness and of a length greater than its width, and that it is formed with an enlargement or head, 20, at one end of its shank portion, 22, and that it is formed with one arcuate edge, 24, along its thickness, so that not only do all of its three dimensions vary, but at least two of the dimensions themselves vary along the length of the article, namely, the thickness and width.

At the upper extremity of the spiral track 16 there are provided means for orienting the pieces moving along it to move along at least one common dimension. Such orienting means comprises wipers at each side of the upper track terminal which, in the illustrative embodiment, are arranged to restrict the outlet of the track to the thickness of the bit 18 and to dispose each article passing by them to rest on its least dimension or thickness thereof. Such wipers consist of an upright faced projection or shoulder, 26, extending gradually inwardly and outwardly over the track 16 from the side wall, 28, thereof, and a cooperating helical inner wall, 30, rising from the floor of the track 16 opposite the shoulder 28 which helical wall tends to lift and tilt any of the bits 18 that is disposed on the side other than the thickness or of the least dimension, to dispose on its smallest dimension or on the edge of its thickness. The shoulder 28 and the helical wall 30 may, if desired, be adjustable or replaceable, to provide for use of the apparatus with articles of different thickness and different size and shape.

At the upper end of the spiral track 16, exteriorly of the wipers, there is provided a downwardly sloping incline or ramp, 32, defined by side walls, 34, to a width equal to the narrowed exit of the track 16, along which the oriented articles or bits move, by gravity, to a downwardly sloping agitated, as vibratory conveyor, generally designated as 38. The conveyor 38 consists of a pair of spaced bars, 40, set on edge and mounted in any suitable operatively associated manner on a vibrator, 42, of any suitable type. The bars 40 are spaced apart only sufficiently to accommodate in the space, 44, between them, the narrower portion of the thickness or shank 22 of a bit 18, so that its head 20 rests on the upper edges of the bars 40, along which the bit slides under the vibratory impulse provided by the vibrator 42.

It will be seen that at this point in the feeding, the bit 18 is moved in either one of two positions; namely, with its arcuate edge 24 either foremost or rearmost. In order to further orient the bit 18 so that all bits are advanced in their final stage with their arcuate ends in uniform direction, namely, rearmost, I provide a wiper arm, 46, supported in transverse position slightly in advance of the end of the conveyor 38 and in raised or elevated relation thereto.

The wiper arm 46 may be supported by one end, as by being integrally formed with it, from an upright, 48, which may, in turn, be vertically adjustably supported, to one side of the conveyor 38, in any suitable conventional manner, on a transversely disposed upright member or standard, 50. The latter, in turn, is supported in upright position from the base, 52, adapted to rest on a feeder supporting surface.

Supported, by one end, in any desired manner, on the standard 50 is a chute, generally designated as 54, which extends in a forward and downwardly sloping direction relative the wiper arm 50. Such chute 54 comprises a bottom wall or slide, 56, side walls, 58, which limit the width of the chute to accommodate only the thickness of the bit 18 at its widest part, namely, its head 20, and preferably also a top cover, 60, the rear end of which, adjacent the wiper 46, may be upwardly curled, as at 62. The chute 54 is supported, preferably adjustably with its upper or inner end on a lever lower than the lower or outer end of the vibrating conveyor 38.

As the bits 18 move down the conveyor 38, any bit positioned with its arcuate edge inner most, its upper end or head 20 projecting above the conveyor 38 will strike the wiper arm 46, so that the movement of its upper end will be arrested; its lower position continuing to move under the impulse of the vibrations until the bit approaches a horizontal position with its lower end extending into the chute 54, so that the head 20 of the bit which, while moving along the conveyor 38, is tilted forwardly, straightens up and clears the conveyor 38 into the space between it and the wiper arm 46 and advances into the chute 54 down which it moves with its shank end foremost and its head 20 rearmost, as clearly shown in Fig. 3. However, if the bit 18 moves down the conveyor 38 with its curved edge outermost, its head 20 will slope inwardly and its lower end will curve inwardly and away from the chute 54, so that when such bit reaches the end of the conveyor 38 the head 20 will clear the same without touching the wiper arm 46 and the bit 18 will drop down clear of the chute 54 and out of the feeding apparatus. In this way only bits 18 that move down the conveyor with their curved edges rearmost will enter the chute 54 that directs them to the desired processing apparatus, and all bits that reach such processing apparatus, will be identically oriented.

Figure 7:
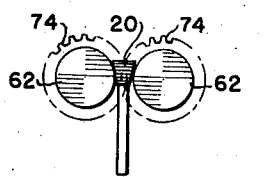
Fig. 7 is a section taken on line 7—7 of Fig. 6.
Figure 8:
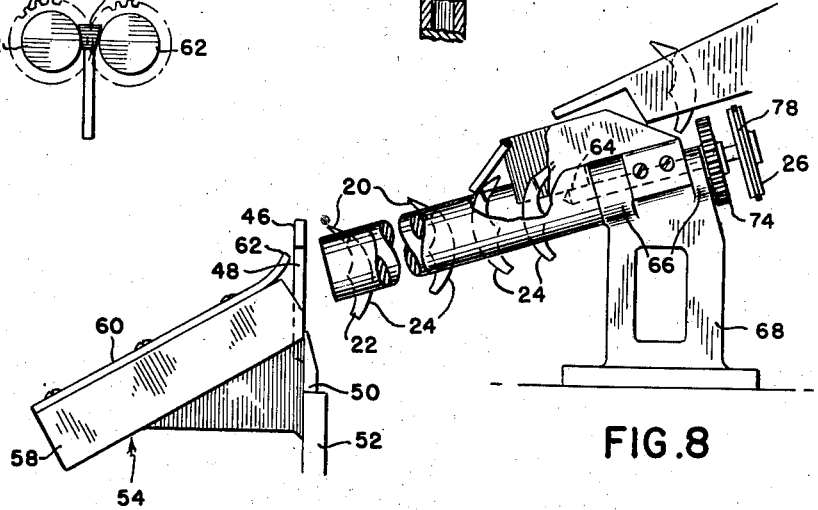
Fig. 8 is a fragmentary, side elevational, foreshortened view of feeding apparatus embodying modification of Fig. 6.

In the modification of Figs. 7 and 8, the vibrating conveyor 38 is substituted by a conveyor of a different type that likewise moves the bits gravitationallly towards the chute 54 by a continuous agitation of such bits. Such substitute conveyor comprises a pair of rollers, 62, each of which may have a shaft, 64, axially set into one end thereof by which shafts they may be journalled in parallel sets or bearings, 66, at the top of a standard, 68. The sets of bearings 66 are arranged in such spaced relation to one another that a space, 70, is provided intermediate the rollers 62 of a width sufficient to freely admit the shank 22 of the bit 18, but insufficient to clear the head 20 thereof. The bearings are so arranged as to support the rollers 62 in forwardly and downwardly slanting position and each of the shafts 64 carries a gear wheel, 74, meshing with the other so that when one shaft is rotated in one direction the other of such shafts will rotate in the opposite direction. A shaft extension is provided on one of the rollers 62 on which is mounted a pulley wheel, 76, that is in operative engagement by means of belt, 78, with the pulley wheel of a motor, 80.

The motor 80 is arranged to rotate the roller 62 to which it is operatively connected in a direction that its top surface portion is always moving away from that of the other roller. Thus, as the bits 18 move down the ramp 32 their shanks 22 will fall into the space 70 between the rollers with their heads 20 resting on the rollers 62 and are continuously loosened and advanced on the rollers, by their rotation away from one another, until such bits reach the forward end of the rollers which terminate short of the wiper arm 46, at which point the same advancing of the properly oriented bits into the chute 54 and the elimination of those improperly oriented from the feeding apparatus takes place in the same manner as described above.

If desired, means for regulating movement or flow of the bits on the conveyor may be provided. Such means may comprise a pair of parallel arms, 82, extending forwardly over the conveyor to a point near its center, at the forward ends of these arms 82 is pivoted, in dependent position, an element, 84, that engages the top of each bit as it passes the same and impinges thereon to retard its movement relative the bits that have already cleared it.

This completes the description of the feeding apparatus of the present invention and the manner in which it operates. It will be apparent that such apparatus is of simple construction, compact and sturdy and economical to produce, and that, nevertheless, it is fully automatic, highly efficient, and completely adequate for its purpose.

It will also be apparent that numerous variations and modifications may be made in the apparatus of the present invention by anyone skilled in the art, in accordance with the principles of the invention hereinbefore set forth, and without the exercise of any inventive ingenuity. I desire, therefore, to be protected for any such variations and modifications that may be made within the spirit of the present invention and the scope of the claims hereto appended.

What I claim is:

1. Automatic feeding apparatus of the character described, comprising a vibratory, bowl-shaped hopper having a marginal spiral track, means at the upper end of said track forming a narrower outlet therefor and adapted to orient articles moved therealong to dispose them on a narrower dimension, an agitatable forwardly sloping conveyor forwardly of said track, in position to receive articles discharged therefrom, said conveyor including a longitudinal, open-ended space of a width less than said track outlet, a second, downwardly sloping chute of a width substantially equal to the width of said track outlet forwardly of said conveyor and sloping downwardly away therefrom, the inner end of said chute spaced from the forward end of said conveyor, and a transversely extending arm mounted forwardly of an in elevated relation to the forward end of said conveyor.

2. Automatic feeding apparatus of the character described, comprising a vibratory, bowl-shaped hopper, said hopper having a marginal spiral track and means at the upper end of said track for narrowing the outlet thereof and for orienting articles moved therealong to dispose them on a narrower dimension including a substantially upright wall member extending gradually inwardly across one side of said track and a substantially helically curved element rising gradually from the opposed side of said track to substantially upright position, a chute of the width of said track outlet extending forwardly and downwardly from said track outlet, an agitatable conveyor sloping forwardly and downwardly from a point below said chute, said conveyor having a longitudinally extending, open ended slot of a width less than the width of said track outlet and in alinement with said chute, a second chute of a width equal substantially to the width of said first chute extending forwardly and downwardly from said conveyor and in forwardly and downwardly spaced relation thereto, and a transversely ing arm mounted forwardly of and in elevation relation to relation to the forward end of said conveyor.

3. The feeding apparatus of claim 2, wherein said agitatable conveyor is vibratory.

4. The feeding device of claim 2, wherein said agitatable conveyor is rotary.

5. The feeding device of claim 2, wherein said agitatable conveyor is vibratory and includes a pair of parallel spaced bar elements with the space between them defining a slot of lesser width than said track outlet and means for vibrating said bars.

6. The feeding apparatus of claim 2, wherein said agitatable conveyor is rotary and comprises a pair of rollers disposed parallel to and spaced from one another a distance less than the width of said track outlet, means at one end of said rollers interconnecting the same for simultaneous movement in opposed directions and means for rotating said rollers to have their upper portions move away from one another.

7. The feeding apparatus of claim 2, wherein said second chute is provided with supporting means at its inner end and wherein said transverse arm is mounted on said second chute supporting means.

8. The feeding apparatus of claim 2, wherein said second chute is provided with supporting means at its inner end and wherein said transverse arm is mounted for vertical adjustment on said second chute supporting means.

9. Feeding apparatus of the character described, comprising, in combination, a vibratory, bowl-shaped hopper having a marginal spiral track and means at the upper end of said track for narrowing the outlet thereof and simultaneously orienting an article moving along said track to dispose it to rest on a narrower dimension thereof, an agitatable conveyor slopingly disposed forwardly of said track outlet, said conveyor including a longitudinal open ended space of a lesser width than said outlet arranged in alinement with said outlet, a second chute of a width equal substantially to the width of said track outlet said track outlet slopingly disposed forwardly of said conveyor and spaced forwardly and downwardly therefrom and means above and forwardly of the inner end of said conveyor for tripping selectively oriented articles moving therealong to dispose them in position for entering said chute.

10. The combination of claim 9, wherein said track narrowing and article orienting means comprises a substantially upright wall portion extending gradually inwardly and outwardly across one side of said track and a substantially helically curved member rising from substantially flat position to substantially upright position along the other side of said track opposite said wall member.

11. The combination of claim 9, including a chute of a width equal substantially to the width of said track outlet sloping downwardly from said track outlet over the inner portion of said conveyor in alinement with the longitudinal space thereof.

12. The combination of claim 9, wherein said means for tripping articles comprises an arm disposed transversely of said conveyor and forwardly of and above the forward end thereof.

13. The combination of claim 9, wherein said means for tripping articles comprises an arm disposed transversely of said conveyor and forwardly of and above the forward end thereof and means supporting said transverse arm in vertically adjustable position.

14. Automatic feeding apparatus of the character described, comprising means for advancing a plurality of articles in succession to one another, means, including a narrowed passageway at the end of said article advancing means, for orienting said articles to dispose them on a narrower dimension, a forwardly and downwardly sloping conveyor forwardly of said passageway in position to receive articles discharged therefrom, said conveyor including a longitudinal, open ended space of a width less than the width of said passageway, a downwardly sloping chute of a width substantially equal to the width of said passageway forwardly of said conveyor and sloping downwardly away therefrom, the inner end of said chute spaced from the forward end of said conveyor, and a transversely extending arm mounted forwardly of and in elevated relation to the forward end of said conveyor.

15. The feeding apparatus of claim 14, wherein said article orienting passageway includes a track, a substantially upright wall extending gradually inwardly across one side of said track and a substantially helically curved element rising gradually from the opposed side of said track to substantially upright position.

16. The feeding apparatus of claim 14, wherein said conveyor is vibratory.

17. The feeding apparatus of claim 14, wherein said conveyor is rotary.

18. The feeding apparatus of claim 14, wherein said conveyor is vibratory and includes a pair of parallel bar elements spaced from one another with the space between them defining a slot of lesser width than said passageway and means for vibrating said bar lements.

19. The feeding apparatus of claim 14, wherein said conveyor is rotary and comprises a pair of rollers disposed parallel and spaced from one another a distance less than the width of said passageway, means at one end of said rollers for interconnecting the same for simultaneous movement in opposed directions, and means for rotating said roller to have their upper surface portions move away from one another.

20. A selective conveyor for articles having each a relatively thick first portion and a relatively thin, curved stem portion extending from said first portion, comprising an agitatable conveyor section including an open ended slot of a width exceeding the thickness of said stem portion and less than the thickness of said first article portion, a chute of a width exceeding the thickness of said first article portion extending forwardly and downwardly away from said conveyor section, the inner end of said chute spaced from the forward end of said conveyor section, and a transversely extending arm mounted forwardly of and in elevated relation to the forward end of said conveyor section.

21. The conveyor of claim 20, wherein said agitatable conveyor section includes a pair of spaced forwardly sloping bar elements with the space between them defining said open ended slot, and means for vibrating said bar elements.

22. The conveyor of claim 20, wherein said agitatable conveyor section comprises a pair of rollers disposed parallel to and spaced from one another, said space forming said open ended slot, means interconnecting said rollers for simultaneous rotation in opposed direction, and means for rotating said rollers to have their upper surface portions move away from one another.

References Cited in the file of this patent

UNITED STATES PATENTS

| | | |
|---|---|---|
| 1,984,962 | Brunn | Dec. 18, 1934 |
| 2,252,498 | Flaws, Jr. | Aug. 12, 1941 |
| 2,362,517 | Woodberry | Nov. 14, 1944 |
| 2,377,431 | Lakso | June 5, 1945 |
| 2,725,971 | Clark-Riede | Dec. 6, 1955 |
| 2,744,612 | Kay | May 8, 1956 |